(12) United States Patent
Guracar et al.

(10) Patent No.: US 7,780,601 B2
(45) Date of Patent: Aug. 24, 2010

(54) ADAPTIVE CLINICAL MARKER PRESERVATION IN SPATIAL COMPOUND ULTRASOUND IMAGING

(75) Inventors: Ismayil M. Guracar, Redwood City, CA (US); Bimba Rao, San Jose, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 471 days.

(21) Appl. No.: 11/810,515

(22) Filed: Jun. 5, 2007

(65) Prior Publication Data

US 2008/0306382 A1 Dec. 11, 2008

(51) Int. Cl.
*A61B 8/00* (2006.01)
(52) U.S. Cl. ...................... 600/447; 128/916
(58) Field of Classification Search ......... 600/407–472; 128/916
See application file for complete search history.

(56) References Cited

U.S. PATENT DOCUMENTS

| | | | |
|---|---|---|---|
| 5,148,810 A | 9/1992 | Maslak et al. | |
| 5,235,986 A | 8/1993 | Maslak et al. | |
| 5,261,408 A | 11/1993 | Maslak et al. | |
| 5,479,926 A | 1/1996 | Ustuner et al. | |
| 5,566,674 A | 10/1996 | Weng | |
| 5,575,286 A | 11/1996 | Weng et al. | |
| 5,782,766 A | 7/1998 | Weng et al. | |
| 6,014,473 A | 1/2000 | Hossack et al. | |
| 6,117,081 A | 9/2000 | Jago et al. | |
| 6,126,598 A | 10/2000 | Entrekin et al. | |
| 6,126,599 A | 10/2000 | Jago et al. | |
| 6,135,956 A | 10/2000 | Schmiesing et al. | |
| 6,508,770 B1 | 1/2003 | Cai | |
| 6,790,181 B2 | 9/2004 | Cai et al. | |
| 6,858,010 B2 | 2/2005 | Guracar et al. | |
| 6,872,181 B2 | 3/2005 | Tirumalai et al. | |
| 2002/0167533 A1 | 11/2002 | Tirumalai et al. | |
| 2008/0175453 A1* | 7/2008 | Hao et al. | 382/128 |

* cited by examiner

*Primary Examiner*—Eric F Winakur
*Assistant Examiner*—Michael T Rozanski

(57) ABSTRACT

Clinical markers are adaptively identified in steered spatial compounding ultrasound imaging. Motion is detected. The use or determination of the clinical marker information adapts to the amount of motion. If sufficient motion is detected, the contribution of clinical marker information may be reduced, the weighting of the clinical marker information relative to the steered compound information is reduced, the acquisition sequence is adjusted for component frames of data, or combinations thereof.

20 Claims, 3 Drawing Sheets

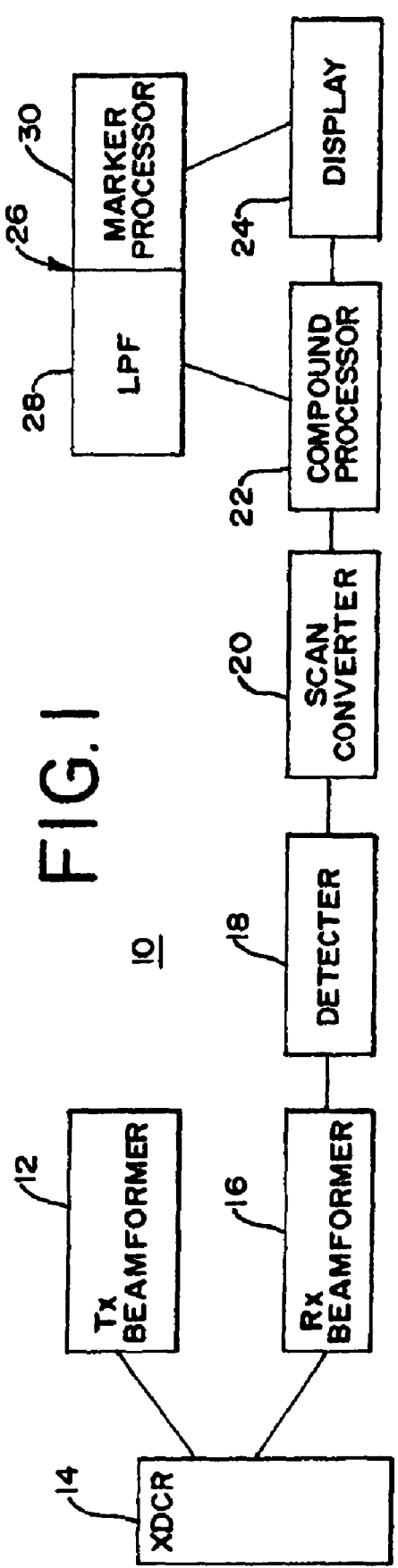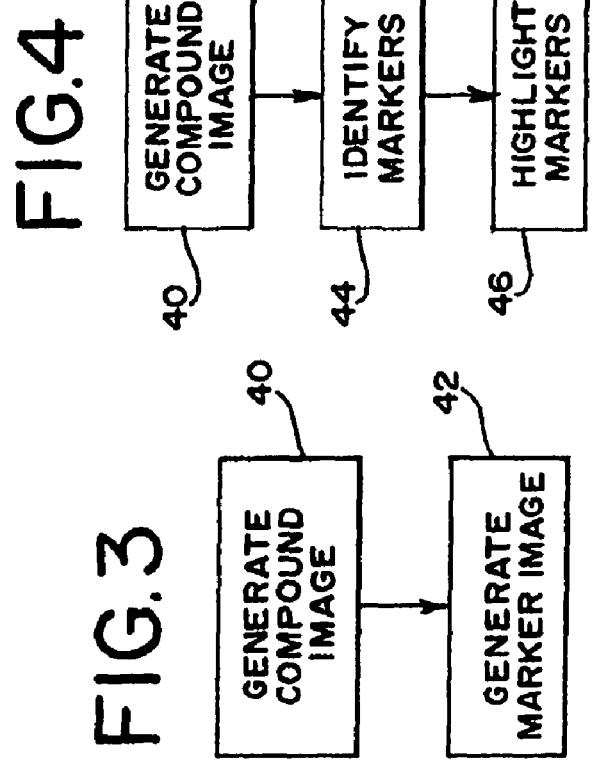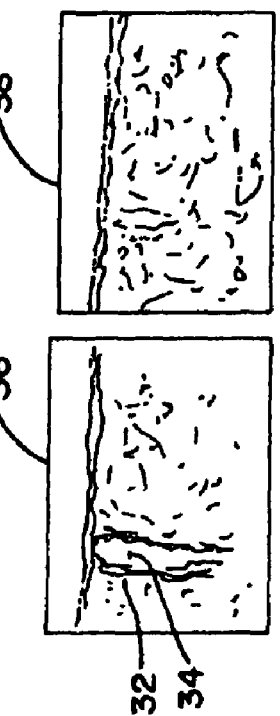

Clinical Marker Preservation Processing

ADAPTIVE CLINICAL MARKER PRESERVATION IN SPATIAL COMPOUND ULTRASOUND IMAGING

BACKGROUND

The present invention relates to spatial compounding. In particular, the present invention relates to compounding component frames of data associated with different angles to reduce speckle and produce a more continuous border in specular targets, such as muscle layers.

One component frame of data is acquired by scanning along scan lines at one angle or pattern relative to a transducer. A second component frame of data is acquired by scanning along scan lines at a different angle or pattern. Each of the frames of data represents a different but overlapping region of a patient due to the angle or pattern of the scan lines. The frames of data are compounded together and displayed as an image. The transducer is held at substantially one position on the patient for acquiring the sequential component frames of data.

Steered spatial compounding may mask or change the appearance of clinical markers. Clinical markers are an important diagnostic tool. Either shadows (i.e. dark lines) or a brightened area (i.e. bright lines) are produced in the images of surrounding tissue by objects or obstructions in the body. Calcifications produce shadows. Fluid filled cysts often produce brightened areas. The markers are frequently used to help identify pathology. The appearance and orientation of these markers depends on the orientation of the ultrasound beams. As a result, compounding frames of data associated with different steering angles or patterns reduces or eliminates desirable markers in the resulting compound image.

U.S. Pat. No. 6,858,010 discloses steered spatial compounding where clinical marker information is preserved. For example, an image responsive to less spatial compounding more likely preserves clinical markers than a steered compound image. By displaying both images, clinical markers are identified by the user from one image and other diagnostic information is obtained from the steered compound image. As another example, clinical marker information is added back into or highlighted on a steered compound image for identification by the user. However, movement of the transducer during acquisition of the component frames of data or frames used for identifying clinical markers may result in misalignment of information.

U.S. Pat. No. 6,858,010 discloses that motion between component frames of data may be detected. The component frames of data are then interpolated or altered to compensate for the motion. The motion compensated component frames of data are then used for compounding and identifying markers. However, this in-plane tracking and compensation may be computationally expensive. Out-of-plane motion cannot be corrected by motion tracking and compensation without more complex equipment and computation expense.

BRIEF SUMMARY

By way of introduction, the preferred embodiments described below include methods, computer readable media, instructions, and systems for adaptively identifying clinical markers in steered spatial compounding ultrasound imaging. Motion is detected. The use or determination of the clinical marker information adapts to the amount of motion. If sufficient motion is detected, the contribution of clinical marker information may be reduced, the weighting of the clinical marker information relative to the steered compound information is reduced, the acquisition sequence is adjusted for component frames of data, or combinations thereof.

In a first aspect, a method is provided for adaptively identifying clinical markers in steered spatial compounding ultrasound imaging. A compound frame of data responsive to electronically steered component frames of data is generated. The electronically steered component frames of data are acquired from a substantially same transducer position and are responsive to different steering angles. A marker frame of data responsive to less compounding than the compound image is generated. The marker frame of data is from the substantially same transducer position. Motion of the transducer position, a scanned object or combinations thereof is detected. An acquisition sequence for the component frames of data, a contribution of the marker frame of data to a combined frame of data, or combinations thereof is modified as a function of the motion.

In a second aspect, a computer readable storage medium has stored therein data representing instructions executable by a programmed processor for adaptively identifying clinical markers in steered spatial compounding ultrasound imaging. The storage medium includes instructions for correcting a spatially compounded frame of data with clinical marker information, detecting motion of a transducer, a scanned object, or combinations thereof, and adjusting the correction as a function of the motion.

In a third aspect, a system is provided for adaptively identifying clinical markers in steered spatial compounding ultrasound imaging. A beamformer is operable to acquire a sequence of electronically steered component frames of data responsive to different steering angles from a substantially same transducer position. A filter is operable to filter data. The data is a function of at least one of the component frames of data, the filtered data comprises a clinical marker frame of data. A processor is operable to generate a compound image responsive to the electronically steered component frames of data and a clinical marker frame of data, and operable to alter the filter, the sequence, or both as a function of an amount of motion. A display is operable to display the compound image.

Further aspects and advantages of the invention are discussed below in conjunction with the preferred embodiments. The present invention is defined by the following claims, and nothing in this section should be taken as a limitation on those claims.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

FIG. 1 is a block diagram of one embodiment of a system for identifying markers in steered compound imaging;

FIG. 2 is a graphical representation of a compound image and a marker image of one embodiment;

FIG. 3 is a flow chart diagram of one embodiment for identifying markers to a user;

FIG. 4 is a flow chart diagram of another embodiment for identifying markers to a user;

DETAILED DESCRIPTION OF THE DRAWINGS AND PRESENTLY PREFERRED EMBODIMENTS

Compounding component frames associated with different scans reduces high spatial frequency and low spatial frequency variations, such as speckle and image artifact clinical marker variations. Since clinical markers may be used to assist in locating a region of interest within the patient, steered compounding may limit the ability to locate the region for diagnosis. However, an image free of spatial compounding includes undesirable speckle.

The imaging described below provides for spatial compounding while minimizing the disadvantages of reduction in clinical markers. The compound image is formed from a sequence of component frames of data acquired at different times. Marker information is added to or displayed by the compounded image. FIGS. 1-4 are FIGS. 1-4 of U.S. Pat. No. 6,858,010, the disclosure of which is incorporated herein by reference. These FIGS. 1-4 and the corresponding description below show systems, methods, and example images for preserving clinical marker information in spatial compounding.

Figure 5:
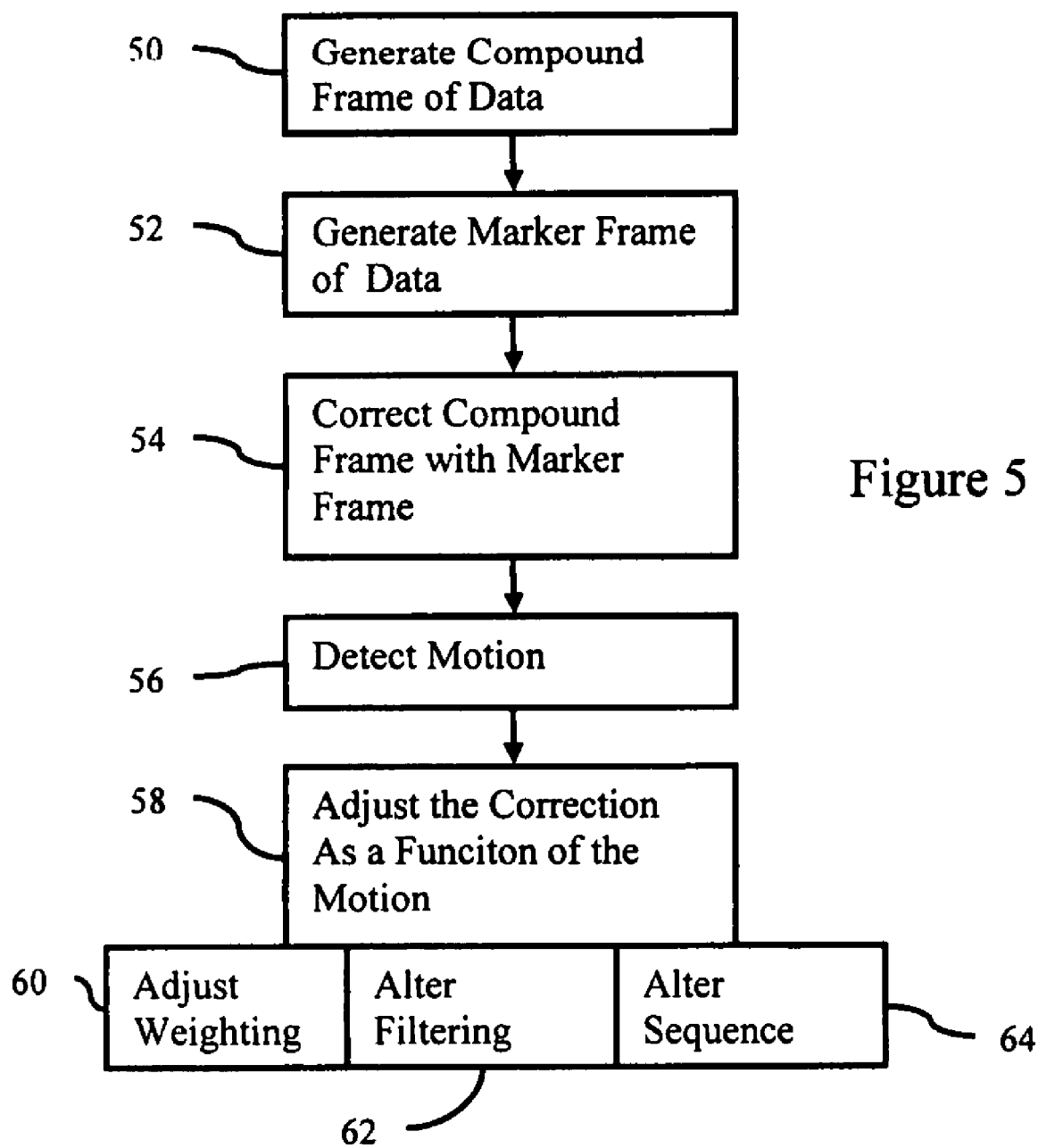
FIG. 5 is a flow chart diagram of one embodiment for adaptively identifying clinical markers in steered spatial compounding ultrasound imaging.
Figure 6:
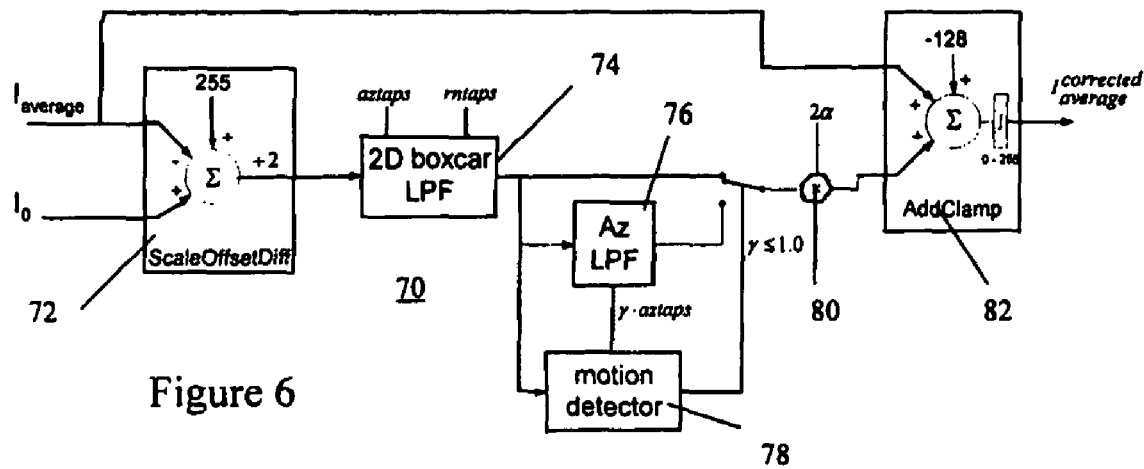
FIG. 6 is a block diagram representing one embodiment of a system for adaptively identifying clinical markers in steered spatial compounding ultrasound imaging.

Motion may occur between the component frames of data. The steered compounding and/or clinical marker processing adapt to the occurrence of motion. The systems, methods, and examples of FIGS. 1-4 may be adapted to account for motion in addition to or as an alternative to motion tracking and compensation between component frames of data. FIGS. 5 and 6 show a method and system for adaptively identifying clinical markers in steered spatial compounding ultrasound imaging. In the description below, the adaptation of FIGS. 5 and 6 is provided before the compounding of FIGS. 1-4.

FIG. 5 shows one embodiment of a method for adaptively identifying clinical markers in steered spatial compounding ultrasound imaging. The identification adapts to motion. The method is performed in the order shown or a different order. For example, act 52 is performed before act 50. Additional, different, or fewer acts may be provided. For example, correcting the compounded frame with the marker frame of act 54 is not provided, but separate images are generated for the compound and marker information. As another example, acts 60, 62, and 64 are example adjustments as a function of detected motion. Any one may be used alone or in combination with one or more of the others. Additional options for adjusting may be used.

In act 50, a compound frame of data responsive to electronically steered component frames of data is generated. The frame of data is generated as discussed below in FIGS. 1-4. The electronically steered component frames of data are acquired by scanning. During the scanning of one embodiment, the transducer position is substantially stationary. The electronically steered component frames of data are responsive to different steering angles. Any two or more frames of data are combined, such as by averaging or maximum value selection. For example, at least three electronically steered component frames of data responsive to three different steering angles, respectively, are combined.

In act 52, a marker frame of data is generated. The marker frame of data is generated as a correction as discussed below for FIGS. 1-4. The marker frame of data is responsive to less compounding than the compound frame of data. For example, the marker frame of data is generated from a subset of the component frames of data. In alternative embodiments, the marker frame of data is a function of one or more frames of data not used for the compound frame of data. The marker frame of data is from the substantially same transducer position as used for the component frames of data.

The marker frame of data is generated from one or more other frames of data. In one embodiment, the marker frame of data is generated from a plurality of component frames of data, but without the contribution of the straight ahead (i.e., scan line(s) normal to the array) component frame of data. The component frames of the subset are combined, or the frames not being used are subtracted from the compound frame of data. For example, the compound frame of data is subtracted from the straight-ahead component frame of data. Each frame for preserving markers is generated as a function of the straight-ahead or other type of component frame of data.

The resulting frame of data is low pass filtered to increase visualization of the clinical markers. Any low-pass filtering may be used. For example, a separable boxcar filter with filter lengths of about 5 times the wavelength, such as 10 taps, in range and azimuth assuming Nyquist sampling in both directions, is used. Other filters and/or tap lengths may be used. Other marker preservation functions than low pass filtering may be used. The marker preservation function preserves and/or enhances shadows behind structures. For example, the average brightness of the straight-ahead image ($I_0$) is preserved in the compounded image, $I_{average}$.

In act 54, the spatially compounded frame of data is corrected with the clinical marker information. Portions of the compound frame of data are highlighted or altered based on detected clinical markers. Other corrections may be provided, such as discussed below for FIGS. 1-4. In one embodiment, the compound frame of data is combined with the marker frame of data. Any combination may be used, such as averaging or weighted averaging with an infinite or a finite impulse response.

In one embodiment, the combined frame is a function of a weight. The low-pass filtered data for the marker is multiplied by the weight. The weighted data is added to the compound frame of data. This embodiment is represented by:

$$I_{average}^{corrected} = I_{average} + \alpha \cdot LPF\_2D\{I_0 - I_{average}\}$$

where $\alpha$ is the weight and $LPF\_2D\{I_0 - I_{average}\}$ is the low pass filtered marker frame of data formed from the difference of the compound frame of data and the straight ahead component frame of data. The weight may be different for different situations. For example, the weight is transducer specific, application specific, or transducer and application specific. In one embodiment, the weight is set to 0.5 for breast applications and 0.75 for vascular applications.

In act 56, motion of the transducer position, a scanned object, or combinations thereof is detected. Motion of the transducer position may be detected by a sensor on the transducer. For example, magnetic coils detect relative or absolute motion of the transducer. Transducer motion and/or motion of the scanned object may be detected from scanned data, such as a minimum sum of absolute differences or correlation between component frames of data. Other techniques for motion detection, such as correlation comparisons or based on an ECG signal, may be applied.

In one embodiment, the motion is detected from the marker frame of data, such as the two dimensionally low pass filtered difference image, $LPF\_2D\{I_0 - I_{average}\}$. The frame of data is decimated in range and azimuth by a factor of ½ of the tap lengths of the azimuth and range filters, such as decimated by 5. Other or no decimation may be used. The resulting data reduced frame of data is divided into a plurality of separate regions, such as 64×64 regions. For example, each region has a target size of 8×8 in range and azimuth of the decimated frame of data. Each region is sized to include at least 10 scan lines and range samples of the marker frame of data prior to decimation. If there are not at least 10 lines or range samples in each region, then the total number of regions is reduced. Other numbers of regions, size of regions, or limitations on regions may be used.

The average intensity in each region is calculated as a region value. Other values may be calculated, such as a maximum, sum, or median. Alternatively, the data of each region is maintained without further combination of data.

The amount of change in the frame of data is determined from the region values. For example, region values are compared with previous frame region values using a sum of absolute differences (SAD). The resulting SAD estimate is compared to a threshold. In another example, the data for each region is compared with the data for the corresponding region of a previous frame. The comparison is a SAD or other correlation. The highest SAD estimate from all of the regions is then compared with a threshold. As another example, the largest, an average, a median, or other difference between region values of a previous frame and the current frame is determined. The difference is compared with a threshold.

The threshold distinguishes between two levels of motion. A higher correlation indicates less motion. A lower correlation indicates more motion. Multiple thresholds may be used to indicate three or more levels of motion. In one embodiment using a normalized SAD value, the threshold is 5.0 out of a possible range of 0 to 255. Other thresholds may be used.

The correction of act 54, the generation of act 50, and/or the generation of act 52 are adjusted as a function of detected the motion. For example, an acquisition sequence for the component frames of data, a contribution of the marker frame of data to a combined frame of data, or combinations thereof are modified as a function of the motion. If there is little or no motion, the process proceeds without modification or is modified to operate in a no motion mode. If there is motion, the process is modified or proceeds without modification in a motion mode. Any aspect of the clinical marker preservation may be adjusted as a function of the motion.

In one embodiment, the contribution of the marker frame to the combined frame is decreased for greater motion and increased for lesser motion in act 60. The weighting in the combination and/or the amount of filtering may increase or decrease the contribution. When the probe is held still, the full desired correction to preserve markers is applied.

Weighting is adjusted as a function of the motion in one embodiment. The weight α is adjusted based on the level of motion. For example, the weight is set to 0.10 for breast applications and 0.15 for vascular applications in response to detecting sufficient motion.

The brightness of the component views may be different. In particular the average brightness of the straight-ahead component frame of data, $I_0$, is greater than that of the compound frame of data, $I_{average}$, because many specular targets are perpendicular to the straight ahead view direction. An adjustment of the weight α based on motion may cause fluctuations of the combined frame of data brightness. The fluctuation depends on the level of motion unless the average brightness of the straight-ahead view is matched or corrected to the average compounded brightness. To maintain a substantially consistent brightness associated with the corrected spatially compounded frame of data for different amounts of the motion, the brightness is matched or corrected.

Alternatively, a different adjustment is used. In one embodiment, the filtering is modified as a function of the amount of motion in act 62. For example, the amount of filtering increases for greater motion and decreases for lesser motion. The filtering is adjusted by changing weights, number of taps, bandwidth, type of filter, or other filter characteristic. For example, a number of filter taps, a number of filters, or combinations thereof are increased for greater motion. In one embodiment, the lateral filter length of the low-pass filtering adapts as a function of the motion. The lateral filter length is adjusted by again filtering the low-pass filtered data and adding the twice-filtered data to the compound frame of data. The lateral filter length may additionally or alternatively be adjusted by changing a number of taps. Adjustment in the range direction may also be used. The filter adjustment may preserve the average brightness of the combined frame of data during periods of transient motion.

FIG. 6 shows one embodiment of a filter 70. A frame of data is formed by the summer 72. The compound frame of data is subtracted from the straight-ahead frame of data. The result is low pass filtered by the filter 74. The amount of motion is detected by the motion detector 78. The motion detector 78 detects motion from the low pass filtered data. For low or no motion, the output of the filter 74 is passed to the multiplier 80. The output is weighted by the multiplier 80. The weighted data is the marker frame of data. The marker frame of data is added to the compound frame of data by the adder 82, providing the combined frame of data. For higher motion, the output of the filter 74 is filtered by the additional filter 76. A filter size adjustment factor, γ, is set to 10.0 (for example), and the low pass filtered difference frame of data is filtered by the additional azimuthal low pass filter 76 of tap length equal to γ·azTaps (e.g., 100 taps). The additional filter operation is represented by:

$$I_{average}^{corrected,motion} = I_{average} + \alpha \cdot LPF\_AZ\{LPF\_2D\{I_0 - I_{average}\}\}$$

The added filter 76 laterally filters the brightness correction. By increasing the number of taps by a factor of 10.0 or other factor, the brightness may be maintained, but clinical marker information may be reduced.

The adjustment of act 58 is by a set amount, such as a binary or other multilevel adjustment depending on the amount of motion. Alternatively, the amount of adjustment may be varied, such as slowing or speeding response to detected motion. In one embodiment, the modifying is more drastic in response to the motion changing from below to above the threshold motion and less drastic in response to the motion changing from being above to below the threshold motion.

For example, if the amount of motion in the maximum SAD region falls below the threshold, the azimuthal filter taps adjustment factor is persisted with the previous value used during processing of the previous frame by a persistence factor. For example, γ'=markerPreserveGammaPersistence·γ where markerPreserveGammaPersistence is 0.9 or other value less than 1. Once motion stops or falls below the threshold, the γ value slowly decays by each frame having a value of 90% of the previous frame value. The change in γ slowly reduces the size of the additional lateral filter 76. Once γ falls below 1.0, the additional lateral filter is switched off. More or less rapid transition may be used. For increasing motion, the factor γ changes from 1.0 or not used to 10.0 in response to the first detection of sufficient motion. Less rapid increases may be used. This fast attack, slow decay adjustment of the lateral filter size avoids large changes in brightness when the transducer or patient is moving due to mismatches in brightness and content between the straight-ahead and fully compounded images.

The change in correction filter size may be in both range and azimuth, and the time varying component of this change could be temporally filtered by other types of filters such as FIR. The correction filter size change may be spatially dependent so that different levels smoothing of the correction filter are used for different regions depending on the level of motion found in each region.

Referring again to FIG. 5, another adjustment of act 58 is to alter the acquisition sequence in act 64. The acquisition sequence for generating the compound frame of data in act 50 and/or for generating the marker sequence in act 52 is modified as a function of the detected motion of act 56. The sequence may be adjusted to provide different steering, a different number of component frames of data, or other sequence characteristic. In one embodiment, the sequence is adjusted to allow for an increased frequency of the correcting of act 54 or marker frames of data. For example, the sequence is altered for generating the compound frame of data to include more of one or more type of the component frame of data for motion detection.

In one embodiment of adapting the sequence, the time between the marker frame of data update and the compounded frame of data is reduced. The type of frame of data used for the marker frame of data is the straight-ahead view, for example. The rate or frequency of straight-ahead view acquisition is increased when motion is detected. For example, the normal (no or little motion) repeated acquisition sequence for 9-way compounding is $[I_0\ I_1\ I_2\ I_3\ I_4\ I_5\ I_6\ I_7\ I_8]$ where $I_N$ are component frames of data at different steering angles and $I_0$ is the straight-ahead view. A sequence with reduced motion artifact with clinical marker correction is: $[I_0\ I_1\ I_2\ I_3\ I_4\ I_5\ I_6\ I_7\ I_8]$. The marker correction for the compounded result is derived from the most recent available $I_0$ frame, and is updated more frequently based on the more frequently available straight ahead view. Other sequences may be used.

The new reduced motion artifact sequence is enabled whenever motion is detected. The compounded frame, $I_{average}$ is derived from all frames from the 8 steered views ($I_1$–$I_8$) and the three additional $I_0$ frames in a moving average fashion. Alternatively, the number of frames that are combined for compounding could also be reduced in the presence of motion to further reduce motion artifact. For example, only the most recent three frames of the sequence are combined such that the most recently acquired $I_0$ is always included along with two steered views in forming the compound and the marker frames of data. When little or no motion is detected, the normal sequence with the associated decreased frame rate of the compound frame of data is used.

FIG. 1 shows a system 10 for identifying clinical markers in steered spatial compounding ultrasound imaging. The system 10 may also detect and adapt to motion. The system 10 is a medical diagnostic ultrasound system, such as a Sequoia®, Aspen™, Antares® or other systems manufactured by Siemens Medical Solutions USA, Inc. In alternative embodiments, ultrasound systems by other manufacturers may be used. In yet other alternative embodiments, all or part of the system 10 is a workstation, such as the Aegis or Perspective™ system, for processing or displaying medical images.

The system 10 includes a transmit beamformer 12, a transducer 14, a receive beamformer 16, a detector 18, a scan converter 20, a compound processor 22, a display 24 and a marker identification circuit 26. Different, fewer or additional components may be provided. For example, an offline workstation implements the compound processor 22, marker identification circuit 26 and display 24 without the additional ultrasound acquisition components. As another example, a dual display system may not include the marker identification circuit 26. In another example, a separate processor, the compound processor 22, or the marker processor 30 are operable to detect motion, control a sequence performed by the beamformers 12, 16, and/or control the filtering applied by the filter 28.

The transducer 14 comprises an one—or multi-dimensional array of piezoelectric, ceramic, or microelectromechanical elements. In one embodiment, the transducer 14 is a one-dimensional array of elements for use as Vector®, linear, sector, curved linear, or other scan format now known or later developed. The array of elements has a wavelength, half wavelength, or other sampling frequency. A half-wavelength sampling of elements allows for greater steering angles, providing more spatial diversity for speckle reduction by compounding. The transducer 14 is adapted for use external to or use within the patient, such as a handheld probe, a catheter probe or an endocavity probe.

The transmit and receive beamformers 12, 16 operate as a beamformer. As used herein, "beamformer" includes either one or both of transmit and receive beamformers 12, 16. The beamformer is operable to acquire electronically steered component frames of data responsive to different steering angles from a substantially same transducer position. The same scan pattern with different steering angles or different scan patterns resulting in different steering angles are used. Between two different scans, one or more scan lines may extend at a same angle from a same origin, but other scan lines are steered at different angles to provide component images responsive to different steering angles. For a given origin, at least one scan line is at a different angle between the scans for two component frames of data.

The component frames of data represent different overlapping regions or a same region of the patient. The transducer 14 is substantially held in place for acquiring the component frames of data. "Substantially" is used to account for unintentional movement of the person holding the array, breathing or other motion caused by the patient be scanned, and any other incidental movement associated using a probe not mounted in a fixed position relative to a patient fixed in place.

The transmit beamformer 12 is one or more waveform generators for generating a plurality of waveforms to be applied to the various elements of the transducer 14. By applying relative delays and apodizations to each of the waveforms during a transmit event, a scan line direction and origin from the face of the transducer 14 is controlled. The delays are applied by timing generation of the waveforms or by separate delay components. The apodization is provided by controlling the amplitude of the generated waveforms or by separate amplifiers. To scan a region of a patient, acoustic energy is transmitted sequentially along each of a plurality of scan lines. In alternative embodiments, acoustic energy is transmitted along two or more scan lines simultaneously or along a plane during a single transmit event.

The receive beamformer 16 comprises delays and amplifiers for each of the elements in the receive aperture. The receive signals from the elements are relatively delayed and apodized to provide scan line focusing similar to the transmit beamformer 12, but may be focused along scan lines different than the respective transmit scan line. The delayed and apodized signals are summed with a digital or analog adder to generate samples or signals representing spatial locations along the scan line. Using dynamic focusing, the delays and apodizations applied during a given receive event or for a single scan line are changed as a function of time. Signals representing a single scan line are obtained in one receive event, but signals for two or more scan lines may be obtained in a single receive event. A component frame of data is acquired by scanning over a complete pattern with the beamformer. In alternative embodiments, a Fourier transform or other processing is used to form a component frame of data by receiving in response to a single transmit.

The detector 18 comprises a B-mode detector, Doppler detector or other detector. The detector 18 detects an intensity, velocity, energy, variance or other characteristic of the signals for each spatial location in the component frame of data.

The scan converter 20 comprises a processor, filter, application specific integrated circuit or other analog or digital device for formatting the detected data from a scan line format to a display or Cartesian coordinate format. The scan converter 20 outputs each component frame of data in a display format. The component frames may include pixels representing regions outside of the display region. In one embodiment, each component frame has the same number of pixels and an associated image geometry corresponding to the display region as described in U.S. Pat. No. 6,790,181, the disclosure of which is incorporated herein by reference.

The compound processor 22 comprises one or more memories, processors, control processors, digital signal processors, application specific integrated circuits, multiplexers, multipliers, adders, lookup tables and combinations thereof. In one embodiment, the compound processor 22 comprises a personal computer, motherboard, separate circuit board or other processor added to an ultrasound system for image processing using transfers of data to and from the ultrasound image generation pipeline or processing path (i.e. receive beamformer 16, detector 18, scan converter 20 and display 24). In other embodiments, the compound processor 22 is part of the image generation pipeline.

The compound processor 22 is operable to combine or compound one or more component frames of data representing at least a same region for display. For example, the compound processor 22 comprises a memory and multiplier for each of the component frames and an adder connected to each of the multipliers for combining signals representing a given spatial location from each of the component frames of data in a finite impulse response filter format. Linear or non-linear combinations of component frames of data may be provided.

The compound processor 22 is operable to combine detected and scan converted data. In alternative embodiments, the compound processor 22 is positioned between the detector 18 and scan converter 20 for combining detected but not scan converted data, positioned prior to a log compressor of the detector 18 for combining non-compressed information or positioned prior to the detector 18. Any of various embodiments for combining multiple data representing the same region or combining component frames of data may be used.

In one embodiment, the compound processor 22 includes an image display plane or memory for each of the component frames, such as six display planes. Each display plane has foreground and background pages for allowing simultaneous writing to memory while reading out from memory, but other memory structures may be provided. The memory stores information for each spatial location, such as flow mode or Doppler mode parameter data, B-mode data, a color pan box information and the display region border information. A filter responsive to different multiplier coefficients combines the component frames using different functions. For example, a component frame of data associated with minimal steering is weighted greater than other component frames, but equal weighting may be provided or other frames weighted greater. A lookup table provides the different weighting coefficients to the multipliers. Different coefficients may also be provided for combining different numbers of component frames.

The display 24 is a CRT, monitor, flat screen, LCD, projection or other display for displaying the compounded ultrasound image. During the display refresh, the component frames are read, weighted, summed and thresholded to generate the image on the display 24 where display plane memories are used for each component frame of data. The resulting frame of data is a compound image responsive to component frames of data. The display image format or display region is trapezoidal, trapezoidal like, rectangular, sector, pie shaped or other shape. The compound image is updated in real-time, such as updating the compound image as each new component frame of data is acquired and a previous component frame of data is removed from a previous compound image or is removed from a buffer for compounding the next compound image. Alternatively, real-time compounding is provided by compounding different sets of component frames of data with no or few component frames used in common for each set. In yet other alternative embodiments, offline or non-real time compounding is provided.

The display 24 is operable to display a compound image responsive the electronically steered component frames of data. The compound image includes preserved low spatial frequency variation (i.e. highlighted markers) and reduced high spatial frequency variation as compared with at least one of the electronically steered component frames of data. For example, markers associated with low spatial frequency variation are identified and added into the compound image. The display 24 is operable to highlight the marker in the compounded image either by adding the marker information to the image or by otherwise designating marker residual or other information in the compounded image.

The marker identification circuit 26 identifies the markers for highlighting the markers or otherwise adding in marker information on a compound image. The marker identification circuit 26 is a low pass filter 28 and a marker processor 30, but different, additional or fewer components may be used. In one embodiment, the low pass filter 28 is a digital or analog circuit with fixed or programmable response functions implemented as a infinite or finite impulse response filter. The marker processor 26 is a same or different device than the low pass filter 28, such as being implemented on a digital signal processor or general processor separate from the low pass filter.

In an alternative embodiment, the low pass filter 28 and the marker processor 30 are implemented in the same device as the compound processor 22 or in a different device but with one or more of the structures disclosed above for the compound processor 22. For example, the marker identification circuit 26 is implemented in a personal computer motherboard arranged to receive transfers of data from an ultrasound processing pipeline in a medical diagnostic ultrasound system. In one embodiment, each of the component frames of data, such as three frames of data, is encoded into separate red, green, and blue video channels and sent to the personal computer for digitization. The personal computer performs the low pass filtering and compounding operations. The highlighting is performed by the personal computer. The processed images are then displayed on the display 24. The personal computer motherboard may also perform other image processing functions, such as speckle reduction.

The marker processor 30 is operable to identify one or more markers and output a frame of data indicating the location of the markers. For example, one or more regions associated with the filtered data output by the low pass filter are identified as a marker. Thresholding, gradient processing or other algorithms identify the markers. In an alternative embodiment, the data output by the low pass filter without further processing identifies the markers, such as using the low pass filtered data as a correction or marker frame of data. The marker processor 30 or the compound processor 22 is operable to combine the correction frame of data responsive to the low pass filter with the compounded frame of data responsive to the electronically steered component frames of data or combine with a component frame of data prior to compounding. The displayed compound image is responsive to the combination of the correction frame of data with the compounded frame of data. Because of this further combination, the markers are highlighted on the displayed compound image or added back into the compounded frame of data for display as the compounded image.

Referring to FIG. 2, markers 32 (brightness), 34 (shadow) are alternatively or additionally identified or shown in a different image 36. The display 24 is operable to display a compound image 38 responsive the electronically steered component frames of data. Adjacent to the compound image 38, a marker image 36 responsive to less compounding than the compound image is displayed. The marker image 36 is free of steered compounding in one embodiment, but may be compounded from fewer component frames, compounded different amounts as a function of a identified marker or compounded with a different process than the compound image 38 (e.g. different weights applied to each component frame of data). The marker image 36 is acquired from substantially the same transducer position as the component frames of data.

The two images 36, 38 are updated substantially continuously. For example, the marker image 36 is responsive to only one of the component frames of data used for the steered compound image 38. In one embodiment, the compound image 38 is updated as discussed above and the marker image 36 is updated every time the component frame of data at the selected angle, such as associated with no steering or a straight ahead view, is acquired. In alternative embodiments, one or both of the images 36, 38 are not substantially continuously updated. The transducer may move unintentionally, intentionally or not at all as the images are updated.

For displaying the marker image 36 and the compound image 38, the marker identification circuit 26 is optional or not included in the system 10. The compound processor 22 generates both images 36, 38, such as by passing one frame without compounding and generating the compounded frame of data. The marker identification circuit 26 in other embodiments may further identify the markers 32, 34 and enhance, alter or reduce the appearance of the markers 32, 34 in the marker image 36 and/or the compound image 38.

The system 10 is operable for adaptively identifying clinical markers in steered spatial compounding ultrasound imaging. The filter 28 is as described above or is the filter shown in FIG. 6. The motion detector 78 of FIG. 6 is implemented by the marker processor 30 of FIG. 1 or other processor. The filter 28 filters data to generate the marker frame of data, such as the correction frame of data. The data for filtering is one or more of the component frames of data, data derived from a component frame of data, or other data.

The compound processor 22, the marker processor 30, a different processor, or combinations thereof are operable to alter the filter 28, the sequence by the one or both of the beamformers 12, 16, or both as a function of an amount of motion. For example, the marker processor 30 determines an amount of motion, and increases or decreases filtering as a function of the motion. In one embodiment, a number of taps, a number of filter layers (filters), or both is increased where the amount of motion exceeds a threshold. As another example, the marker processor 30 and/or a different processor (e.g., beamformer controller or user interface processor) increases a frequency of a first component frame of data in the sequence based on the detected motion. The marker frame of data is generated from the first component frame of data.

The compound processor 22, the marker processor 30, a different processor, or combinations thereof control the reaction to motion. The reaction may allow more or less rapid change based on the change in motion. For example, a reaction to increasing motion is more rapid than a reaction to decreasing motion.

FIGS. 3 and 4 represent methods for identifying clinical markers in steered spatial compounding ultrasound imaging. FIG. 3 represents the method of using different images displayed adjacently, and FIG. 4 represents the method of highlighting identified markers in the steered compound image. Different, additional or fewer acts may be provided in either of the methods.

In both methods, a compound image 38 responsive to electronically steered component frames of data is generated in act 40. Each or multiple of the electronically steered component frames of data are acquired from a substantially same transducer position but at different steering angles. For example, three electronically steered frames of data are acquired in response to three different steering angles or scan patterns with one or more scan lines at a different steering angle. Each of the component frames of data span substantially a same spatial extent of a region of a target, such by maintaining the transducer in a same position with or without intentional wobbling of the transducer. A majority, above 90% or almost all of the scanned region for each of the component frames of data is a same region. In alternative embodiments, the transducer is moved during acquisition of sequential frames of data, such as associated with extended field of view imaging. Where non-linear scan patterns are used or where the transducer is rotated as well as translated, different component frames of data may represent overlapping regions from different angles. By combining the data for the overlapping regions, steered compounding is provided. One of the component frames of data is responsive to at least one different scan line angle relative to at least one location in the scanned region than another of the component frames of data.

Two or more frames of data are acquired representing the same or different regions. For example, the scan lines of three component frames of data are each associated with a different region or scan geometry. The scan lines may be acquired in any format, such as linear, curved linear, sector curved sector, Vector®, curved Vector® and combinations thereof. For example, scan lines acquired with a linear transducer are steered at three different angles in a linear or generally rectangular scan format for three component frames of data, respectively. For one component frame of data, the scan lines originate at different positions on the transducer 14, but two or more scan lines may originate from a same position. Using the linear format, the scan lines are parallel and in a same direction relative to the intersections of the scan lines with the origins on the transducer 14. The majority of the scan lines of each component frame point in a same direction. As another example, different angles from the face of the transducer 14 are provided by a scanning apex position on or behind the transducer 14 for sector or Vector® formats. The scan line density along the transducer surface is either uniform or changes as a function of the scan line position. The scan line density may be different for one frame of data as compared to another frame of data, such as having a different uniform densities or having differences in variation of the density. Any of various combinations of formats or variation in scan line origin or angle within a single scan or between scans resulting in spatial diversity may be used, such as described in U.S. Published Patent Application No. 2002/167533-A1, the disclosure of which is incorporated herein by reference.

Each of the component frames of data corresponds to different electronic steering angles. For example, a majority of scan lines extend in a first direction, such as 10 degrees left from the transducer 14 for one component frame of data. The majority of scan lines extend at a 10 degree right angle from the transducer 14 for another component frame of data. The majority of the scan lines are normal to the transducer 14 for a third component frame of data. Different steering angles other than plus or minus 10 degrees and zero may be used with 2, 3, 4 or more component frames. In one embodiment, one component frame is associated with the maximum angle of steering provided by the transducer 14 without undesired grading lobe effects. A second component frame is associated with the same angle but in a different direction relative to the transducer 14. Additional component frames, if any, are associated with lesser angles of steering. In alternative embodiments, the greatest steering angle is less than the maximum possible with the transducer 14. As another example, the position of the scanning apex of the scan lines is different, such as spaced laterally, between two component frames of data, resulting in different steering angles. As yet another example, the scan lines are steered the same for each component frame of data, but the transducer is wobbled about an axis, such as the azimuth axis.

In addition to or as an alternative to steering, spatial diversity between component frames of data is provided by altering the aperture, apodization or other scan characteristic resulting in different spatial response. Any of various types of compounding may be used, such as: temporal compounding (i.e. each component frame acquired at a different time) or simultaneous acquisition of different component frames; frequency compounding (i.e. each component frame acquired in response to a different frequency characteristic) or component frames acquired with a same frequency; spatial compounding or component frames of data acquired with a same spatial response; steered spatial compounding or component frames of data acquired without steering; and combinations thereof.

In one embodiment, the same or substantially same scan lines are used for both transmit and receive operations for any given component frame of data. In alternative embodiments, one or more of the scan lines are different for transmit than for receive operation. For example, acoustic energy is transmitted along scan lines normal to the transducer 14 for a linear array and received along scan lines at a non-normal angles. For a curved array, the energy is transmitted along scan lines in one format and received along scan lines in a different format, pattern or positions. As another example, the same scan lines are used for transmit for all or multiple of the component frames of data, but different electric steering is provided during receive of each or multiple of the component frames of data as disclosed in U.S. Pat. No. 6,508,770, the disclosure of which is incorporated herein by reference.

Each of the component frames are compounded together for spatial locations representing the display region in act 40. In one embodiment, detected and scan-converted frames of data are compounded together. Since scan-converted information is used, the data of each of the component frames are in a same format and grid pattern or spatial location sampling. In alternative embodiments where data is compounded prior to scan conversion, interpolation, extrapolation or other processes are used to compound any data representing adjacent or similar but not identical spatial locations.

Subsequent compound images in a real time or non-real time format may use one or more of the same component frames again for generating additional compounded images, such as using a moving window for selecting component frames for compounding in a first-in first-out format. Alternatively, each component frame of data is used for generating only one output compounded image. The compounded image is formed from a compound frame of data.

In alternative embodiments, any of the various scanning methods and systems disclosed in U.S. Pat. Nos. 5,148,810, 5,235,986 and 5,261,408, the disclosures of which are incorporated herein by reference, may be used. The techniques disclosed in one or more of these patents show a Vector® scanning pattern using non-overlapping scanning lines for obtaining a wider field of view with a transducer. Scan formats and apparatuses of one or more of the patents show the use of a common apex or vertex of the acoustic lines spaced behind the transducer 14, and the teachings therein may be used for positioning the common apex at different positions laterally along the transducer for obtaining component frames each associated with a different relative steering angle for the majority of scan lines. In other alternative embodiments, any of the spatial compounding techniques and associated acquisition of component frames with different steering angles disclosed in U.S. Pat. Nos. 6,117,081, 6,126,598, 6,126,599, 6,135,956 and 6,872,181, the disclosures of which are incorporated herein by reference, may be used.

Referring to FIG. 3, a marker image 36 in addition to a compound image 38 is generated. The marker image 36 is formed from a marker frame of data. The marker image 36 has less compounding than the compound image 38 at least for the regions associated with the markers 32, 34. The marker image 36 is displayed spatially adjacent to the compound image 38, such as side-by-side, above and below, each image 36, 38 on different adjacent displays 24 or other positions visible during a same examination of a patient. The marker image 36 is free of steered compounding, but may alternatively include some steered compounding. Both images 36, 38 are acquired from substantially the same transducer position, but the transducer 14 is alternatively moved between acquisitions.

In one embodiment, the marker image 36 is generated from one of the component frames of data also used for the compound image 38. For example, the marker image 36 is updated each time a component frame of data associated with a selected steering angle, such as the normal or center steering angle (i.e., straight ahead view), is acquired for compounding. The compound image 38 is updated as well for substantially continuous imaging. Alternatively, the marker image 36 is generated from a frame of data not used for the compound image 38. In yet other embodiments, the marker image 36 is generated as a difference image of the difference between a component frame of data and the compounded frame of data. Other processed images may be used, such as determining the correction frame of data as discussed below and generating the marker image based on only the correction frame of data or the correction frame of data combined with other information.

The generation of the compound image 38 and the marker image 36 is repeated. If both images 36, 38 update during live scanning, then the loss of markers 32, 34 in the compounded image 38 can be readily appreciated by viewing the markers 32, 34 in the marker image 36. The markers 32, 34 include none, one or more bright areas 32 and/or none, one or more shadows 34. The bright areas 32 and shadows 34 are caused by structure in the imaged region and are not otherwise enhanced or altered for presentation on the marker image 36.

The user views the marker image 36 to identify a region of interest and views the compounded image 38 to identify specific tissue or structure within the region of interest. In one embodiment, the dual or adjacent display is adjacent temporally, such as generating the marker image 36 until the region of interest is identified and then switching to the compounded image 38 without resetting or otherwise adjusting the scanning or imaging. In alternative embodiments, the markers 32, 34 are identified by the system 10 and enhanced or altered to highlight the marker 32, 34 in the marker image 36 and/or compounded image 38.

Referring to FIG. 4, markers are identified in act 44 and highlighted in act 46. The markers are highlighted on the compound image 38. The compound image 38 is displayed without an adjacent marker image 36 in one embodiment, so that the compound image 38 is full size or a large size for the display 24. The markers are identified by preserving low spatial frequency variation while the compound image still provides reduced high spatial frequency variation. For example, low spatial frequency variation associated with markers is preserved from one of the electronically steered component frames of data and high spatial frequency variation is reduced by compounding multiple of the electronically steered component frames of data.

To identify the markers in one embodiment, a correction frame of data is generated. The correction frame of data enhances or isolates data corresponding to the markers. For example, one or more of the electronically steered component frames of data is low pass filtered. Any of various low pass filter functions may be used, such as a three by three $[111]^T \times [111]$ box car filter, a cascaded box car filter, a linear filter, a non-linear filter, a median filter, a finite impulse response filter, a infinite impulse response filter or other now known or later developed filters. While the correction frame is formed from one component frame in one embodiment, the correction frame is formed from multiple component frames in other embodiments. For example, three-way steered spatial compounding is provided where $I_0$ is the straight ahead view, $I_1$ is the steered left view and $I_2$ is the steered right view, and an example compounding operation is given by: $C=[I_0+I_1+I_2]/3$. The two dimensional low pass filter operation on the component frames of data is given by: $M_i = lpf\_2d\{I_i\}$ where $M_i$ is the mean. The correction frame is then given as $C_m = [2M_0 - M_1 - M_2]/3$. Other functions to form the correction frame may be used, including different relative weights, numbers of component frames, different filtering, and non-mean terms.

The correction frame of data includes marker information. The mean of the compounded image, $M_c$, is desired so that $M_c = lpf\_2d\{C\}$ is equal to $M_0$ or the mean of the straight ahead view in the example above. It is assumed that $lpf\_2d(M_i) \cong M_i$, which is reasonable with sufficiently large smoothing kernels. For images with a large amount of variance, the amount of smoothing or low pass filtering may be increased so long as the filter kernel is small enough to avoid smoothing out the markers of interest. The size of the spatial filter can be increased to reduce noise from speckle at the expense of being able to resolve and improve the presentation of smaller regions of markers. By summing the correction frame $C_m$ with the compounded frame of data C, the compound image $C_c = C + C_m$. Then, the $lpf\_2d\{C_c\} = [M_0 + M_1 + M_2]/3 + [2M_0 - M_1 - M_2]/3 = M_0$ as desired. The shadows and brightness of the clinical markers are low spatial frequency phenomena. Differences in speckle and continuity in the different steering angles is a high spatial frequency phenomena. The speckle reduction benefit of high spatial frequency compounding is obtained while retaining the low spatial frequency clinical marker information from the straight-ahead view or another view. The correction frame of data includes data representing dark shadow areas that highlight regions which have a shadow in the straight ahead view but not in the steered views and bright areas which show the regions which have shadow in the steered view but not the straight ahead view. In alternative embodiments, other component frames than the normal or straight ahead view are used to provide the marker information.

Where some types of markers are a distraction, their appearance in the final compound image may be reduced or eliminated. In one embodiment, correction frames of data are produced with shadow markers eliminated by setting $C_m = M_c - \max(M_0, M_1, M_2)$. Brightness markers may be eliminated by setting $C_m = M_c - \min(M_0, M_1, M_2)$. The contribution of both shadow and brightness markers may be adaptively eliminated or varied based on the sign of $C_m$ or other information.

The low pass filtering is not altered as a function of the steering angle, but may be altered as a function of steering angle in other embodiments. Markers are more accurately detected by accounting for the direction of the scan lines in filtering. For example, the spatial low pass filter is non-symmetric—long in the depth dimension and short in the lateral dimension to help better detect shadows found in a linear scan format. As another example, the filtering kernels are skewed to match the steering angle if filtering is performed on the video raster Cartesian grid. Filtering in the acoustic grid may allow filters to naturally follow the direction of the shadows. For non-uniform scan line or angle spacing, the kernels can vary by spatial location. As yet another example, the location of the markers is warped. The markers may be detected in each of the component frames of data, such as where a straight-ahead view is not provided. The direction of the marker from each component frame is warped to produce an appropriate marker in the compounded image 38. The marker appears as if produced by a straight-ahead view or normal scan line for one warping, but the marker may be warped to appear to be from other directions. The warping starts at the intersection of the markers where the obstructing object is located in two or more component frames of data, but other techniques for identifying the spatial extent of the marker for warping may be used.

The correction frame of data is formed as an entire frame of data or only includes identified portions of the field of view (frame of data including only portions of the field of view). For example, edges are detected, such as by applying a threshold or other algorithm as now known or later developed. The edge detection algorithm identifies the edges of the markers, such as the edges of shadow or brightness. Areas outside of the identified markers are excluded from the correction image, from warping or from other processing.

To highlight the markers in the compound image in act 46, the markers identified in act 44 are combined with the compounded frame of data. Highlighting includes merely adding marker information to the compounded frame of data, but may also include further enhancement or labeling. The correction frame of data is combined with a compounded frame of data responsive to the electronically steered component frames of data. The compound image is responsive to the combination of the correction frame of data with the compounded frame of data. The compound image includes the added marker information, highlighting the markers. For example, shadows present in the straight-ahead view are restored within the compound image to the average brightness seen in the straight-ahead view. The compounded frame of data prior to correction has reduced or eliminated marker information. By combining the correction frame of data with the compounded frame of data, the markers from the straight-ahead view or other single or group of component frames are restored to the average brightness, but an increased or reduced brightness may be provided.

Grating lobes are more likely to be seen in the steered or non-normal views because of more undersampled beamforming. Grating lobes present in the steered views may also be removed by using the straight-ahead view for the correction frame of data. Since grating lobes are typically low spatial frequency phenomenon, the compounding reduces the grating lobe artifacts. Since the straight-ahead view contains less grating lobe artifact information, the grating lobes are not added back into the compounded image.

To highlight the markers, the correction frame of data is summed with the compounded frame of data. A simple summation as represented by: $C_c=C+C_m$ may be used, but other summations, such as including relative gain corrections may be used. Functions other than summation may be used, such as subtraction, multiplication, division or combinations thereof. In one embodiment, the contribution of the correction frame of data to the compound image is varied. For example, the combination is represented by: $C_c=C+\alpha C_m$, where $\alpha$ is a variable contribution term, such as 1.0. In other embodiments, the $\alpha$ is applied to C instead of $C_m$. By setting $\alpha$ appropriately, the amount of shadow or brightness from the straight-ahead view visible in or added to the compound image is varied as a function of time or spatial location. $\alpha$ is set by the user, programmed or varies based on one or more other inputs. For example, $\alpha$ is a function of the sign and/or magnitude of $C_m$. $\alpha$ is based on the sign of $C_m$ in one embodiment. Shadow markers are presented differently from brightness markers. $C_m>0$ identifies shadow in the steered views that is not present in the straight-ahead view as well as enhancement in the straight-ahead view not present in the steered views. $C_m<0$ identifies enhancement in the steered views that is not present in the straight-ahead view as well as shadows in the straight-ahead view not in the steered views. For example, $\alpha$ is set to 1.0 if $C_m>0$ and 0.5 if $C_m<=0$ so that the average brightness of the shadow region from the straight-ahead view is substantially reduced but the average brightness of the regions with shadow in the steered views is increased somewhat in the compounded image. This causes the shadow to be spread out over a larger region than would otherwise be seen in the straight ahead view only and allows the portion of the tissue directly behind the object to be presented with the same clarity (darkness) as the straight ahead view. Depending on the application, a greater or lesser value of $\alpha$ is selected based on the sign of $C_m$. This could be useful to highlight calcifications, which produce shadows, or to highlight cysts, which can produce brightness.

As an alternative to the combinations discussed above, the correction frame is combined in a non-linear function with the compounded frame of data. Various non-linear combinations of high contrast and high detail data are known, such as described in U.S. Pat. No. 5,479,926, the disclosure of which is incorporated herein by reference. These non-linear combinations and processes may be used to combine the compounded frame of data with the correction frame of data. An analogous processing function is provided as represented by: $C_c=\Delta(C, C_m)$. This non-linear delta function is selected to enhance the markers or highlight the markers on the compound image. The non-linear function is calculated or implemented as part of a two dimensional look-up table. Different combinations of inputs can be used to perform the non-linear combination. Any of various non-linear functions may be used, such as depending on the desired imaging application.

Further, $C_m=f(M_0,M_c)$ can be implemented as a two dimensional look-up table and cascaded with the look-up table for combining the compounded frame of data with the correction frame of data.

Another combination function includes an additive correction scaling term ($\alpha$) as well as a geometric modulation term ($\beta$). For example: $C_c=\gamma C (1.0+\beta C_m)+\alpha C_m$. The correction frame of data, $C_m$, modulates the brightness of the image. The $\beta$ term is a geometric scaling term, such as 0.02 or another value. The $\gamma$ term allows $C_m$ to be viewed alone for experimental purposes or adjustment by the user of scanning parameters to optimize marker identification and highlighting.

The combined frame of data is displayed as the compound image. At least one marker is highlighted in the compound image. For example, the shadow or brightness added by the correction frame of data results in highlighting the markers. Alternatively, the markers are spatially identified as distinct artifacts, such as by applying a threshold or other edge detection algorithm. For example, the sign and magnitude of the correction frame of data information are used to identify particular types of markers, such as shadow or brightness markers. The markers are then further enhanced to further highlight the markers in the compounded image. For example, the markers are displayed with a different color than non-marker portions of the compounded image. Different markers have the same colorization or different colorization, such as shadows highlighted in blue and brightness highlighted in yellow on an otherwise grey scale image. The color is modulated based on the correction frame of data.

An artifact (i.e. marker) responsive to a structure is highlighted. The artifact is either a shadow or a brightened area. Alternatively, a structure associated with an identified artifact is highlighted. Objects or structure at the intersection of markers are identified from different component frames of data. Each component frame of data indicates the location of one or more markers. By identifying the intersection of multiple markers within a component frame of data or between different component frames of data, structure of interest, such as a calcification or cyst, is identified. Alternatively, the structure is identified by another algorithm, such as an edge detection technique accounting for the marker or artifact. The identified structure associated with a marker is highlighted by colorization or other enhancement.

In one embodiment, the highlighting is a post processing function or occurs after receive beam formation. The function is turned on or off by the user, such as by depressing a button during live imaging or viewing of saved images. Other options are available, such as displaying the corrected compound image side-by-side or spatially adjacent to a compound image without correction or highlighting.

In another alternative embodiment, the transducer 14 is moved during acquisition of the component frames of data. The compounded image represents an extended field of view. As different views are compounded together, the different directions of the ultrasound beams are used to synthesize a corrected image with shadows and enhancement preserved. For example, a correction frame of data is generated from a selected one of the component frames of data and used to correct the extended field of view or a compounded image representing part of the extended field of view. U.S. Pat. Nos. 5,566,674, 5,575,286, 5,782,766 and 6,014,473 describe various techniques for extended field of view imaging and are incorporated herein by reference. For either embodiments with a substantially stationary transducer 14 or extended field of view embodiments, motion between component frames of data may be detected. The component frames of data are then interpolated or altered to compensate for the motion. The compensated component frames of data are then used for compounding and identifying markers.

Contrast agents may produce shadows because of strong acoustic absorption. Contrast agents are imaged non-destructively using various scanning sequences or destructively using a loss of correlation between sequential pulses. The shadows for contrast agent imaging may be reduced by steered compounding if the contrast agent is confined to a small area and the scan lines are able to traverse behind the areas of strong absorption without obstruction. The location of the contrast agent or resulting shadow is then highlighted as discussed above.

In an alternative or additional embodiment, an indication of similarity is calculated and/or displayed adjacent to the compound image with or without highlighting. The similarity indication is a meter, color bar, numeric value or other indicator without an ultrasound image (i.e. free of an image representation). The compound image is displayed as a full size image with the similarity indicator overlaid or adjacent to the compound image. When the similarity indicator suggests that marker information is being lost, such as flashing, changing color, showing a high or low value or other indication, the user can turn on the highlighting or dual display features discussed above or ignore the indicator.

Alternatively, the similarity is calculated without a similarity indicator on the display and the system 10 automatically alters the compounding, switches to dual display or adds highlighting to provide marker information. For example, the correction frame of data, $C_m$, is used to measure when substantial marker information is missing from the displayed compound image. The system 10 switches to displaying an image with reduced compounding to preserve maker information when substantial marker information is missing. The ultrasound system 10 can also or alternatively indicate to the user via the displayed similarity indicator the degree of loss of marker information due to compounding.

The average value of the absolute value of $C_m$ for all or a subset of pixels in the frame of data is one possible measure of similarity. Another measure is to use the count of pixels of $C_m$ which exceed a given threshold. The threshold can be set differently for shadows and brightness markers. Users may be more interested in knowing when shadows are being lost from the compounding, for example when looking for calcifications. There may be applications where the enhancement is of more concern, such as when searching for cystic structures in the body. For another possible measure, a histogram of the $C_m$ values can be computed and the maximum, mean, median or other statistically relevant parameter used to calculate and/or display similarity. Small regions associated with large correction values are detected. The similarity measure is derived from any spatial compounding image components, which have different clinical marker information. Another example is the average difference between the straight-ahead view and one or more of the steered component views. Yet another example is a histogram of differences, which again could be used to ensure that significant loss even of small areas is flagged.

Other alternative embodiments include use for compounding three or four-dimensional images. Component frames of data are acquired with different lateral as well as elevation steering angles. Spatial filters associated with detecting markers are appropriate to the dimensionality of the image data. Markers are highlighted based on a preferential look direction or removed. Other shadow producing objects, such as needles, catheters, stents, radioactive seeds, shrapnel or bullets, may be identified in two, three or four-dimensional imaging using steered compounding as described above. Either the markers or the object based on the detected markers are highlighted.

Reverberation and shadow artifacts occurring in color Doppler imaging are removed in another embodiment. Component frames of data with different steering angles are compounded. If an artifact is present in one of the views or at a different angle, then the compounding may remove the artifact. The artifact is either further removed or added back into the compounded image by the correction frame of data. Since Doppler imaging uses slower frame rates than B-mode imaging and blood flow is dynamic, the frames rates should be kept as high as possible.

In yet another alternative embodiment, the user adjusts one or more parameters associated with the compound image or the correction frame of data. For example, compounding parameters, low pass filtering or other variables discussed above are altered to produce a desired image. The adjustments are performed during CINE playback to allow single images to be viewed with varying levels of processing or during real-time imaging.

The instructions for implementing the processes, methods and/or techniques discussed above are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

While the invention has been described above by reference to various embodiments, it should be understood that many changes and modifications can be made without departing from the scope of the invention. For example, the correction frame of data is subtracted from the compounded frame of data to further reduce markers in the compound image. While the description herein provides examples of steered spatial compounding, other compounding, such as temporal or frequency compounding, may alternatively or additionally be used. It is therefore intended that the foregoing detailed description be regarded as illustrative rather than limiting, and that it be understood that it is the following claims, including all equivalents, that are intended to define the spirit and scope of this invention.

We claim:

1. A method for adaptively identifying clinical markers in steered spatial compounding ultrasound imaging of a scanned object, the method comprising:

generating a compound frame of data responsive to electronically steered component frames of data, the electronically steered component frames of data being from a substantially same transducer position, the electronically steered component frames of data responsive to different steering angles;

generating a marker frame of data responsive to less compounding than the compound frame of data, the marker frame of data being from the substantially same transducer position;

detecting motion of the transducer position, the scanned object or combinations thereof;

modifying a processing parameter for a contribution of the marker frame of data to a combined frame of data, the processing parameter modified as a function of the detected motion; and identifying said clinical markers.

2. The method of claim 1 wherein generating the marker frame comprises generating the marker frame as a low pass filtered frame of data.

3. The method of claim 2 wherein the modifying comprises modifying the contribution of the marker frame of data to the combined frame of data, wherein the contribution is modified by increasing an amount of filtering as a function of motion.

4. The method of claim 3 wherein increasing comprises increasing a number of filter taps, increasing a number of filters, or combinations thereof.

5. The method of claim 1 wherein generating the compound frame of data comprises compounding at least three electronically steered component frames of data responsive to three different steering angles, respectively.

6. The method of claim 1 wherein the modifying comprises modifying the contribution of the marker frame of data to the combined frame of data, and further comprising:

combining the compound frame of data with the marker frame of data, the combining providing the combined frame.

7. The method of claim 6 wherein the combining is a function of a weight for contribution of the compound frame or marker frame to the combined frame, the weight being the processing parameter modified as a function of the motion.

8. The method of claim 1 wherein modifying comprises wherein the contribution is modified by decreasing contribution of the marker frame to a combined frame for greater motion and increasing the contribution for lesser motion.

9. The method of claim 1 wherein modifying comprises:

modifying more drastically in response to the motion being above a threshold motion; and modifying less drastically in response to the motion being less than the threshold motion.

10. The method of claim 1 wherein generating the marker frame of data comprises generating as a function of a first type of component frame of data, and wherein modifying further comprises modifying an acquisition sequence for the component frames of data, wherein the acquisition sequence is modified by altering the acquisition sequence for generating the compound frame of data to include more of the first type of the component frame of data for motion.

11. In a non-transitory computer readable storage medium having stored therein data representing instructions executable by a programmed processor for adaptively identifying clinical markers in steered spatial compounding ultrasound imaging of a scanned object, the storage medium comprising instructions for:

correcting a spatially compounded frame of data with clinical marker information;

detecting motion of a transducer, the scanned object, or combinations thereof; and adjusting a parameter for the correction, the adjusting being a function of the detected motion.

12. The instructions of claim 11 wherein adjusting comprises maintaining a substantially consistent brightness associated with the corrected spatially compounded frame of data for different amounts of the motion.

13. The instructions of claim 11 wherein correcting comprises:

low-pass filtering data;

weighting the low-pass filtered data; and adding the weighted data to the spatially compounded frame of data; and wherein adjusting comprises adjusting the weighting as a function of the motion.

14. The instructions of claim 11 wherein correcting comprises:

low-pass filtering data;

adding the low-pass filtered data to the spatially compounded frame of data; and wherein adjusting comprising increasing a lateral filter length of the low-pass filtering as a function of the motion.

15. The instructions of claim 11 wherein correcting comprises:

low-pass filtering data;

adding the low-pass filtered data to the spatially compounded frame of data; and wherein adjusting comprising again filtering the low-pass filtered data, and wherein adding comprises adding the twice low-pass filtered data to the spatially compounded frame of data.

16. The instructions of claim 11 wherein adjusting comprises increasing a frequency of the correcting.

17. A system for adaptively identifying clinical markers in steered spatial compounding ultrasound imaging, the system comprising:

a beamformer operable to acquire a sequence of electronically steered component frames of first data responsive to different steering angles from a substantially same transducer position; and filter operable to filter second data, the second data being a function of at least one of the component frames of first data, a filtered output of the filter comprising a clinical marker frame;

a processor operable to generate a compound image responsive the electronically steered component frames of first data and the clinical marker frame, and operable to alter the filter, as a function of an amount of motion determined by the processor; and a display operable to display the compound image.

18. The system of claim 17 wherein the processor is operable to increase a number of taps, number of filter layers, or both where the amount of motion exceeds a threshold.

19. The system of claim 17 wherein the processor is further operable to increase a frequency of a first component frame of first data in the sequence, the second data being a function of the first component frame.

20. The system of claim 17 wherein a reaction, by altering of operation of the processor, to increasing motion is more rapid than a reaction to decreasing motion.

* * * * *